3,451,824
PROCESS OF DISCOLORATION IN CHERRIES WITH EDTA

Ellsworth W. McLeod, Inkster, Mich., assignor to Frigid Food Products, Incorporated, Detroit, Mich., a corporation of Michigan
No Drawing. Filed July 8, 1966, Ser. No. 563,724
Int. Cl. A23b 7/14
U.S. Cl. 99—103                                                9 Claims

ABSTRACT OF THE DISCLOSURE

Prevention of discoloration in cherries due to the presence of tannin by treating the cherries with .2–8% EDTA, its alkaline and alkaline earth salts after conventional brining.

---

This invention relates generally to the processing of cherries. More particularly, the present invention is concerned with the firming, brightening, and avoidance of discoloration in artificially colored cherries.

In the commercial production of cherries in the well known maraschino and glacéed forms, it is considered essential that the cherries possess a bright color which is quite familiar to the consumer without any dark spots or discolorations on the surface of the cherries. The cherries also must attain a firmness of body which will permit them to be processed and packed in the usual manner without being easily broken or crushed.

Cherries have been found to easily develop discoloration which, upon dyeing in the usual manner, is visible as unsightly brown or black blemishes on an otherwise brightly dyed body. Any such cherries must be removed from the pack and discarded or graded to a lower quality.

Substantial work has been done by many investigators into these problems connected with processing artificially colored cherries. It was found, for instance, that the presence of metallic ions, such as iron, copper, etc., was a source of the discoloration, these metals being both inherently present in the cherries and supplemented by contact with the various metals used in the construction of the equipment used for processing the cherries. Visual examination of the cherries after conventional processing revealed that the heaviest discoloration seemed to be in the area surrounding the stem holes, but that other dark brown and black areas were distributed around the surface of the cherry. It was found that in these dark areas the cherry possessed a higher content of iron and tannin, and further that these areas were located where the cherries were injured by limb rubbing, wind whipping, and lug scalding. It was then theorized that (a) the presence and high concentration of iron and tannin in the discolored area of the cherries which were either mutilated or bruised was caused by a physiological change taking place within the cherry even after the fruit was picked, and (b) when the cherries were treated with the usual brine treatment, utilizing the conventional sulfur dioxide or bisulfide salt, the discoloration appeared to be increased, particularly after leaching of the brine from the cherries.

One approach to preventing the discoloration which is presently used by cherry processors is the application of calcium phytate to the cherries. This phytate treatment lightens the color of the fruit and produces a better appearing product than the untreated fruit; however, there frequently remain dark areas on the cherry which are either not sufficiently lightened or which are not noticeably improved from their original condition.

Therefore, it is found that the phytate treatment, while seemingly successful in removing or lightening blemishes or discoloration due to iron or other heavy metals such as copper, fails to deal adequately with the tannin concentration and thus does not completely avoid and clear up the discolorations.

The phytate treatment is also deficient in that it does not add firmness to the cherries, and therefore any added firmness must originate solely from the brining treatment, which usually includes a firming agent such as the well known calcium chloride. This added firmness is relied upon to prevent the crushing or breaking of the cherries during the processing and subsequent packing, but has not been found to be totally satisfactory.

It is also known that ethylenediaminetetraacetic acid (EDTA) has been used to complex with heavy metals in many foods to prevent discoloration, but so far as is known, the art has not been able to entirely remove the blemishes and discolorations due to the tannin in cherries.

Accordingly, the principal object of the present invention is to provide a process for treating cherries which are artificially colored so as to avoid any discoloration or blemishes which may be visible on the surface of the cherries.

This invention also has an an important objective the processing of cherries in a manner which produces a firmness in body that aids in the prevention of crushing or breaking during the processing and conventional packing of the cherries.

Another objective of the present invention is to prevent the discoloration or blemishes from appearing on the surface of the artificially colored cherries by reaction with the tannin present in the bruised areas of the cherries.

Other objects and advantages of the present invention will become apparent to those skilled in the art from the following description.

The present invention may be briefly described as a process for the production of artificially colored cherries without dark area, blemishes, or other discolorations by treating the cherries with .2%–8%, based on the weight of the cherries, of EDTA and its alkaline and alkaline earth salts. This treatment also adds a firmness to the cherries which is not obtainable in the ordinary prior treatment.

The cherries to be processed may be any of the conventional and well known varieties. The cherries are washed and subjected to the conventional brining treatment to remove the natural color of the cherries. In accordance with conventional practice, a bleaching agent, usually sulfur dioxide or an alkaline bisulfide salt, and acid release agent to which may be added the conventional firming agent, calcium chloride, all in combination, are used to treat the cherries in the usual manner for a period of time—usually several months—prior to pitting. The cherries may be pitted in the usual fashion, after the normal period of time in the brine, and then optionally may be replaced into the brine until ready for use. In accordance with the common practice, the brine must be leached from the cherries until a level of the sulfur dioxide in the fruit is unobjectionable. This permissible residual concentration of the sulfur dioxide in the cherry is not critical, but usually it is maintained at a level not greater than trace to 250 p.p.m. and is achieved by washing, for instance, in hot water, followed by cold water.

The leaching of the cherries has been found to greatly increase the discoloration normally to be found in the fruit and even the conventional phytate treatment is not sufficient to completely remove or sufficiently lighten the discolorations, so that they are no longer objectionable. The phytate treatment is believed to primarily remove the discoloration due to the heavy metal ions, such as copper and iron, without effectively treating the high concentration of tannin present in the dark areas on the surface of the fruit.

In accordance with the present invention, the addition of .2%–8% EDTA in the form of EDTA or its salts will not only combine with the heavy metals to form a complex, but also forms unexpectedly a gray to amber colored compound with the tannins present in the bruised and discolored areas of the cherries. The significance of this EDTA-tannin compound is that it is easily dyed a bright color with the conventional artificial dyes used for coloring the cherries. This EDTA-tannin compound which is dyed forms a part of the body of the cherry and takes on essentially the same color as the dyed portion of the cherry, making it substantially undetectable upon visual inspection.

Another and equally important and unexpected result attained through the production of the EDTA-tannin compound is that a substantial firmness is added to the body of the cherry. It is surprising that any of the sodium salts or any salt other than calcium would be adequate to firm the cherries, since only the calcium salts were previously recognized to achieve this result, and then only to a limited degree. According to the present invention, however, the tannins present in the bruised areas of the fruits, although more concentrated or localized in that area, nevertheless are to some extent distributed throughout the body of the fruit, and therefore the EDTA-tannin complex is believed to form as a precipitate within the cell walls so as to substantially add to the firmness of the cherry.

The salts of EDTA that have been found useful, in addition to EDTA, are the alkaline salts, such as sodium, potassium, the alkaline earth salts, such as calcium. Particularly, the mixed sodium and calcium salts, such as the disodium monocalcium EDTA, have been found to produce desirable results.

The alkaline content of EDTA may include a substitution of a metal ion in any or all of the acetic acid portions of the EDTA molecule. The common forms of EDTA salts are the di-, tri-, and tetra sodium salts, as well as the tri-potassium salts. The salts usually are in the form of a hydrate, either the dihydrate or trihydrate of the disodium or tetra sodium and tri-sodium salts, respectively. The amount of the EDTA or its salts to be used is to be calculated upon the EDTA content, either as the free acid or as the corresponding acetate.

In accordance with the present invention, the treatment with EDTA may be achieved by adding the EDTA to the conventional brine of sulfur dioxide or any bisulfide conventional release agent, such as hydrochloric acid and which may or may not contain the conventional calcium chloride. The length of time for the EDTA treatment is not critical, it being important only that the EDTA sufficiently react with the tannin to produce a substantially complete reaction of the EDTA with the tannin. The EDTA may also be added to the cherries in the form of an aqueous solution in which the EDTA is in a concentration of .2%–8%, based on the weight of the cherries. In such case, the cherries, after removal of the brine solution, are leached in accordance with the usual practice in hot and cold water. Again the time of contact with EDTA is not critical, the only condition being that there be a substantially complete reaction between the EDTA and the tannin. Generally, whether the EDTA treatment is during the brining or subsequent to the brining, the time of contact with EDTA may vary from approximately a day to several months, or up to a year or more. The temperature of the cherries during the EDTA treatment is not important and may vary from about 40° F. to boiling.

After the EDTA treatment and the formation of the light colored precipitate in the form of the compound of the EDTA-tannin complex, the cherries are firmed to a degree such that they will not be broken or mutilated in subsequent handling or packing, and importantly, this precipitate is capable of being dyed by the conventional dyes to produce a uniform and pleasing color.

The dyes used are any of the conventional dyes, such as the food dyes. These may include—but by no means are limited to—Erythrosine, Ponceau SX, Ponceau 3R, Light Green SF yellowish, Tartrazine, Amaranth, brilliant blue, etc. The amount of the dye conventionally used varies from approximately 3 grams to 35 grams per 100 pounds of fruit. The dyeing process forms no part of the present invention, but is usually accomplished at a pH of approximately 3.6 to 3.9.

As an example of the present invention, 6 gallons (8.25 lbs.) of the Queen Anne variety cherries were washed and placed in the conventional brine solution containing sulfur dioxide and calcium chloride for two months. The cherries were then drained and an aqueous solution of .29% EDTA in the form of disodium-monocalcium salt of EDTA was added to the cherries. The EDTA was held in contact with the cherries for about 3 days and thereafter leached with hot water, followed by cold water. The cherries, when compared with a control having the conventional calcium phytate treatment, were found to be of far better appearance without discoloration and with a substantially firmer body, which resulted in less breakage and ragged pieces.

The cherries were then dyed with Ponceau SX in an amount of 30 grams of dye per 100 pounds of cherries and the product was superior in color and body and had substantially less broken pieces than the control cherries which were similarly dyed.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the appended claims.

I claim:
1. A method of (a) preventing the discoloration occurring in cherries after conventional brining due to the presence of tannin and metals and (b) firming the cherries for subsequent processing, comprising:
   contacting the cherries with .2%–8% by weight of the cherries of an EDTA compound selected from the group consisting of EDTA, its alkaline, and alkaline earth salts for a period of time sufficient for said EDTA to react with substantially all of the tannin to produce a light colored tannin-EDTA compound.

2. The method of claim 1, including dyeing said cherries and said tannin-EDTA compound.

3. The method of claim 1, wherein the metals react with the EDTA compound to form an EDTA complex in addition to the formation of the EDTA-tannin compound.

4. The method of claim 1, wherein the EDTA-tannin compound is formed in part throughout the cherries to firm the body of the cherries.

5. The method of claim 1, including leaching the cherries of the brine prior to contacting with the EDTA compound.

6. The method of claim 1, including adding the EDTA compound to the cherries prior to leaching the brine from the cherries.

7. The method of claim 1, wherein the EDTA compound is the disodiummonocalcium salt of EDTA.

8. The method of claim 1, including dyeing said cherries and said tannin-EDTA compound, wherein the metals react with the EDTA compound to form a complex in addition to the formation of the tannin-EDTA compound.

9. The method of claim 1, including dyeing said cherries and said tannin-EDTA compound, wherein the metals react with the EDTA compound to form a complex in addition to the formation of the tannin-EDTA compound, and wherein the tannin-EDTA compound is formed in part throughout the cherries to firm the body of the cherries.

References Cited

UNITED STATES PATENTS

| | | | |
|---|---|---|---|
| 2,494,258 | 1/1950 | Nichol | 99—156 XR |
| 3,220,853 | 11/1965 | Blakemore | 99—103 XR |
| 3,307,954 | 3/1967 | Golosinec | 99—148 XR |

RAYMOND N. JONES, *Primary Examiner.*

J. M. HUNTER, *Assistant Examiner.*

U.S. Cl. X.R.

99—102